(12) United States Patent
Knapp

(10) Patent No.: US 7,768,293 B1
(45) Date of Patent: Aug. 3, 2010

(54) AUTHENTICATION FOR INFORMATION PROVIDED TO AN INTEGRATED CIRCUIT

(75) Inventor: Steven K. Knapp, Soquel, CA (US)

(73) Assignee: Xilinx, Inc., San Jose, CA (US)

( * ) Notice: Subject to any disclaimer, the term of this patent is extended or adjusted under 35 U.S.C. 154(b) by 8 days.

(21) Appl. No.: 12/421,837

(22) Filed: Apr. 10, 2009

Related U.S. Application Data

(62) Division of application No. 11/223,388, filed on Sep. 9, 2005, now Pat. No. 7,535,249.

(51) Int. Cl.
*H03K 19/00* (2006.01)
(52) U.S. Cl. .......................................... 326/8
(58) Field of Classification Search ................ 326/8
See application file for complete search history.

(56) References Cited

U.S. PATENT DOCUMENTS

| 7,197,647 B1 * | 3/2007 | Van Essen et al. .......... 713/189 |
| 7,243,227 B1 | 7/2007 | Knapp |
| 7,366,306 B1 | 4/2008 | Trimberger |

OTHER PUBLICATIONS

Atmel Corp., "Using the New DataFlash AT45DBxxxC Family" Application Note (AN-9), Nov. 2004, pp. 1-5, available from Amtel Corporation, 2325 Orchard Parkway, San Jose, California 95131.

Atmel Corp., "32-megabit 2.7 volt DataFlash" Product Sheet AT45DB321C, Aug. 2005, pp. 1-40, available from Atmel Corporation, 2325 Orchard Parkway, San Jose, CA 95131.
Xilinx, Inc., "FPGA IFF Copy Protection Using Dallas Semiconductor/Maxim DS2432 Secure EEPROMS" Application Note XAPP780 (v1.0), Aug. 17, 2005, pp. 1-6, available from Xilinx, Inc., 2100 Logic Drive, San Jose, California 95124.
Xilinx, Inc., "Spartan-3E FPGA Family: Complete Data Sheet" Data Sheet DS312, Mar. 21, 2005, pp. 1-2, available from Xilinx, Inc., 2100 Logic Drive, San Jose, California 95124.
Intel Corp., "Intel StrataFlash Memory (J3)" Datasheet 290667-02, Mar. 2005, pp. 47-49, available from Intel Corp., 2200 Mission College Blvd., Santa Clara, California 95054.
U.S Appl. No. 11/223,388, filed Sep. 9, 2005, Knapp.

* cited by examiner

*Primary Examiner*—Vibol Tan
*Assistant Examiner*—Thienvu V Tran
(74) *Attorney, Agent, or Firm*—W. Eric Webostad; John J. King; Thomas George

(57) ABSTRACT

A system for authentication of information provided to an integrated circuit, a method for rights management of an integrated circuit, and a method for configuring a programmable logic device are described. A memory is coupled to a programmable logic device. The memory includes an array of memory cells and storage devices. The storage devices provide a first storage space and a second storage space. The first storage space is for storing a first identifier. The second storage space is for storing a second identifier, which is a transformation of the first identifier. The array of memory cells is for storing configuration information to configure programmable logic of the programmable logic device. The configuration information includes authentication logic information.

20 Claims, 9 Drawing Sheets

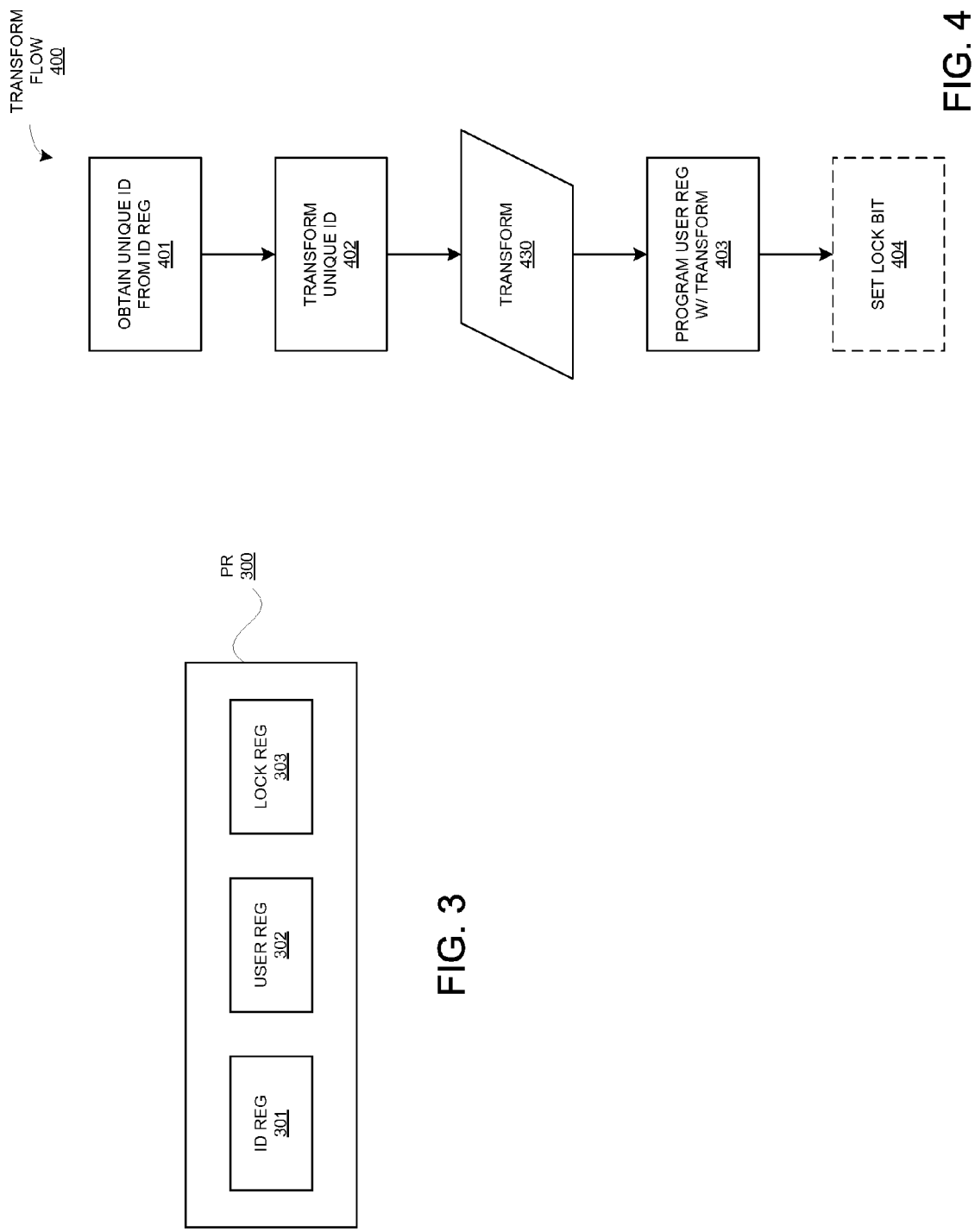

AUTHENTICATION FOR INFORMATION PROVIDED TO AN INTEGRATED CIRCUIT

FIELD OF THE INVENTION

One or more aspects of the invention relate generally to integrated circuits and, more particularly, to authentication for an integrated circuit having programmable logic.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

Examples of FPGAs that may be used include the Virtex® FPGA and Spartan® FPGA both available from Xilinx, Inc. of San Jose, Calif. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block." Furthermore, programmable logic of an FPGA may be used to instantiate a "soft" processor, such as a MicroBlaze™ processor as is known.

Unauthorized copying of a configuration bitstream for a PLD or application code for a processor embedded in a PLD can be costly, as is well-known. Accordingly, it would be desirable and useful to provide means to authenticate a configuration bitstream for a PLD or application code for a processor embedded in a PLD.

SUMMARY OF THE INVENTION

One or more aspects of the invention generally relate to authentication for an integrated circuit having programmable logic.

An aspect of the invention is a system for authentication. A memory is coupled to a programmable logic device. The memory includes an array of memory cells and storage devices. The storage devices provide a first storage space and a second storage space. The first storage space is for storing a first identifier. The second storage space is for storing a second identifier, which is a transformation of the first identifier. The array of memory cells is for storing configuration information to configure programmable logic of the programmable logic device. The configuration information includes authentication logic information.

Another aspect of the invention is a method for rights management of an integrated circuit. A first identifier stored in first storage devices is obtained, the first identifier being associated with a programmable logic device product. A transform is selected for transforming the first identifier responsive to a functionality level. The first identifier is transformed with the transform select to provide a second identifier. The second identifier is loaded in second storage devices associated with the programmable logic device product. Configuration information is provided for configuring programmable logic of the programmable logic device product with the transform selected.

Yet another aspect of the invention is a method for configuring a programmable logic device. A product identification associated with the programmable logic device is read. It is determined whether the product identification is a coded identification to have authentication information added. Responsive to the product identification being the coded identification, the authentication information is obtained and written to storage devices associated with the programmable logic device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 3 is a high-level block diagram depicting an exemplary embodiment of a protection register.

FIG. 4 is a high-level flow diagram depicting an exemplary embodiment of a transform flow.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
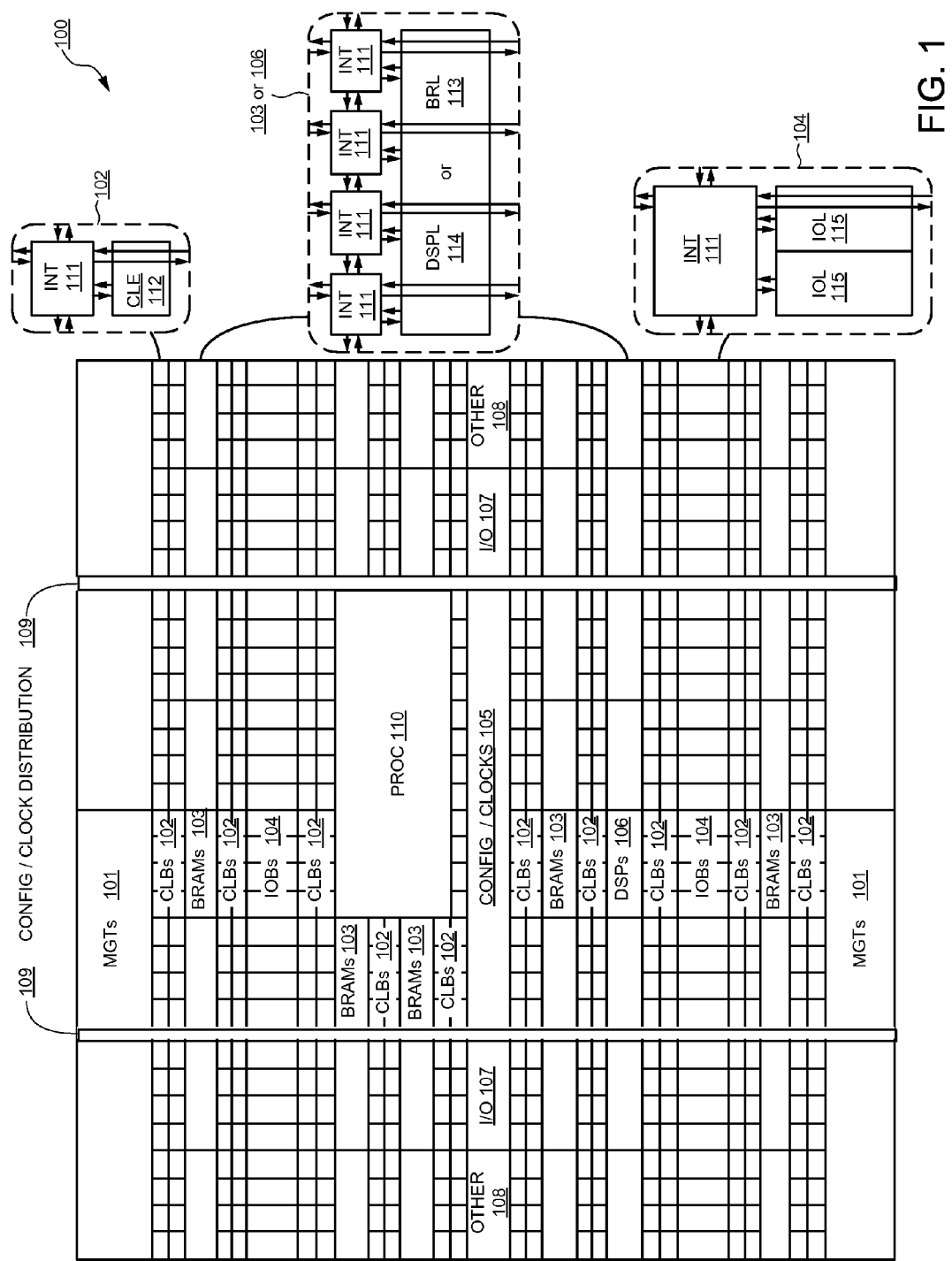
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110. In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

Figure 2A:
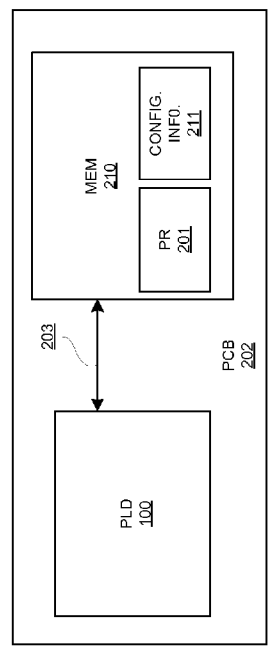
FIGS. 2A through 2D are high-level block diagrams depicting exemplary alternative embodiments of respective PLD systems.

FIG. 2A is a high-level block diagram depicting an exemplary embodiment of a PLD system 200A. PLD system 200A includes a PLD 100 coupled via an interface 203 to a memory 210. For purposes of clarity by way of example and not limitation, it shall be assumed that PLD 100 is an FPGA and memory 210 is a flash memory. However, it shall be apparent to one of ordinary skill in the art from the description that follows that other types of memories and PLDs may be used. Furthermore, it shall be appreciated by one of ordinary skill in the art that integrated circuits having programmable logic, other than PLDs, may be used in accordance with the following description.

Memory 210 includes a protection register ("PR") 201 and configuration information stored in an array of memory cells 211 (hereinafter "configuration information 211"). Notably, the term "register" as used herein is meant to include one or more registers. Configuration information 211 may be stored in memory cells of memory 210. As is known, an FPGA configuration bitstream may be provided to PLD 100 to configure programmable logic. Additionally, any application code for one or more processors embedded ("hard processors") or instantiated by programming programmable logic ("soft processors") in PLD 100 may be provided via interface 203. To protect against copying of such configuration information or any application code, protection register 201 may include authentication information, as will be described in additional detail below.

As is known with reference to flash memory, there are several flash memory devices that have a protection register 201. These types of flash memories may be configured for parallel or serial communication of configuration information, e.g., a configuration bitstream, to a PLD 100. Examples of flash memories that include a protection register 201 are Strataflash from Intel of Santa Clara, Calif. and SPI Serial Flash Memory from Atmel of Santa Jose, Calif., under part number AT45 DB321C. Generally, such types of protection registers include an identification ("unique identifier") that is written to the protection register by the device manufacturer, and which is not subject to being changed after being written.

Notably, configuration information, such as configuration information 211, may be encrypted and decrypted in PLD 100, as is known. However, for purposes of the following description, and to simplify the explanation in order not to obscure the invention, it shall be assumed that configuration information 211 is provided in an unencrypted form. Thus, configuration information 211 is provided to PLD 100, and stored in PLD 100, in an unencrypted form. To re-iterate, in other embodiments, the configuration information 211 may be stored in encrypted form and the PLD 100 may have either a hardcore and/or a softcore decryption circuit that decrypts the configuration information 211 in order to configure the PLD 100. Authentication is used to ensure that there are proper rights to operate instantiated configuration information 211 in PLD 100.

FIG. 3 is a high-level block diagram depicting an exemplary embodiment of a protection register 300. Protection register 300 is an example of a protection register that may be used for protection register 201 of FIGS. 2A through 2C. Protection register 300 includes identification ("ID") register 301, user register 302, and lock register 303. Identification register 301 may be written to by the device manufacturer with a "unique" identifier. By "unique identifier," it is meant that the identifier has a high degree of uniqueness. For example, a unique identifier may be repeated only once out of one hundred or more instances. However, the actual frequency of repetition of a unique identifier may be less than one out of a hundred depending on the application. This unique identifier that is written to identification register 301 is not alterable by a user after it is written.

In contrast, a user register 302 may be written to and altered by a user. A user may be provided with a user identifier by a manufacturer for writing to user register 302, which in turn may be used to authenticate and activate a PLD, such as PLD 100 of FIG. 2A for example. To prevent unwanted or unauthorized altering of information in user register 302, a lock register 303 may have a lock bit set to prevent altering contents in user register 302. In the above description, identification register 301, user register 302, and lock register 303 have been described as being implemented as registers; however, it should be appreciated that storage devices other than registers may be used. For example, fuses or antifuses may be used. Additionally, for some applications, memory cells may be suitable for use. Thus, more generally, identification register 301, user register 302, and lock register 303 may be thought of as respective programmable fields. However, for purposes of clarity by way of example and not limitation, registers are described below even though other types of storage devices may be used.

Returning to FIG. 2A, protection register 201 may have written thereto a unique identifier provided by the manufacturer as well as a user identifier, which may be a transform of the unique identifier. Notably, by having a unique identifier which is not accessible to a user, a user may not know what user identifier to use to result in the unique identifier by an inverse transform. Configuration information 211 may include configuration information for an inverse transform or a transform for authentication. The authentication process is described below in additional detail.

Figure 2B:
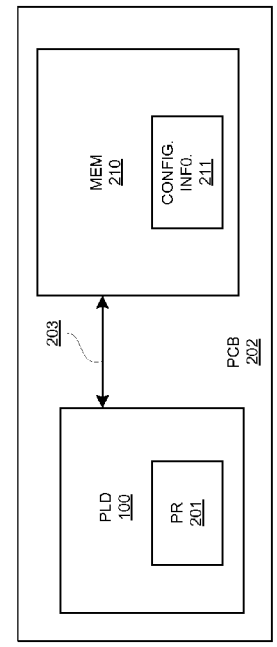

FIG. 2B is a high-level block diagram depicting an exemplary embodiment of PLD system 200B, which is a variation of PLD system 200A of FIG. 2A. In PLD system 200B, PLD 100 includes protection register 201. It will be appreciated from the description that follows that protection register 201 may be located in memory 210 or PLD 100, or a combination thereof.

Figure 2C:
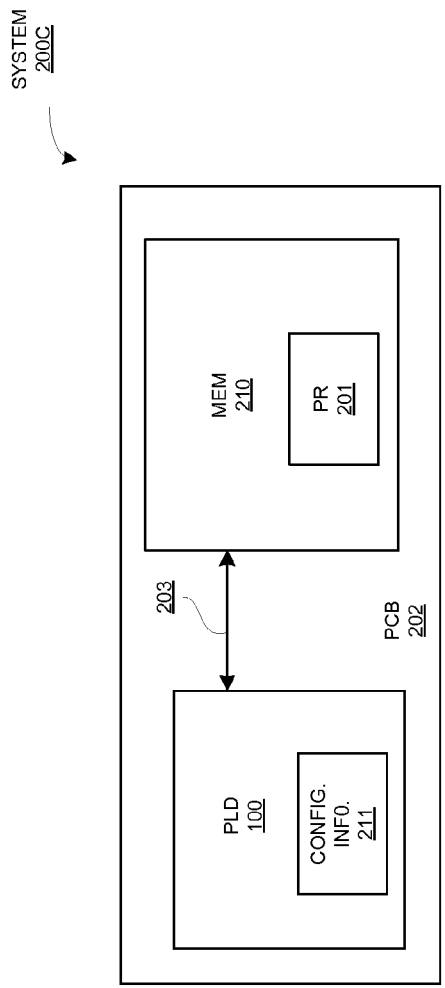

FIG. 2C is a high-level block diagram depicting an exemplary embodiment of a PLD system 200C, which is a variation of PLD system 200B. In PLD system 200C, protection register 201 is located in memory 210 and configuration information 211 is stored in embedded memory of PLD 100. Again, configuration information 211 may include configuration information for programming programmable logic to perform either a transform or an inverse transform, or both.

Figure 2D:
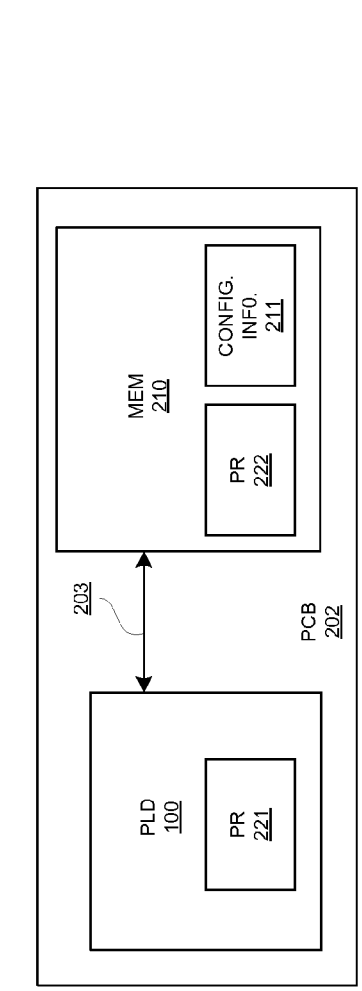

FIG. 2D is a high-level block diagram depicting an exemplary embodiment of a PLD system 200D. PLD system 200D is similar to PLD system 200A, except that protection register 201 is replaced by into protection registers 221 and 222. Protection register 221 may be for storing a unique identifier, which is not accessible by the user, and protection register 222 may be for storing a user identifier, which may or may not be lockable against subsequent alteration. Alternatively, protection register 221 may be for storing a user identifier, which may or may not be locked against subsequent alternation, and protection register 222 may be used for storing a unique identifier which is not accessible by a user.

Notably, in each of PLD systems 200A through 200D illustratively shown in FIGS. 2A through 2D respectively, PLD 100 and memory 210 are mounted on a PCB 202. It should be appreciated, however, that such a configuration is not necessary. For example, memory 210 and PLD 100 may be stacked.

FIG. 4 is a high-level flow diagram depicting an exemplary embodiment of a transform flow 400, which is described with additional reference to FIGS. 2A through 2D and FIG. 3. At 401, a unique identifier is obtained from an identification register 301. At 402, the unique identifier is transformed. The actual transform may vary from application to application, as the degree of reverse engineering of a transform algorithm may be more rigid for more secure systems than in less secure systems. As is known, there are multiple types of transformations that may be used; for example, an encryption algorithm, an encoding algorithm, a digital signature algorithm, a hashing function, a combination of the unique identifier for the flash with a FPGA ID code, or a combination of a portion of the FPGA bitstream and the unique identifier; as these and other types of transformations are well-known, they are not described in any detail herein.

Output of the transform of a unique identifier is transform 430. Transform 430 is programmed into a user register at 403. Again, there are multiple known techniques to program a user register, which are not described in unnecessary detail herein for purposes of clarity. Additionally, it should be appreciated that as described above with reference to FIGS. 2A through 2D, configuration information may include transformation configuration information for programming programmable logic to perform a transform or inverse transform. With respect to the former, a PLD 100 may be programmed with programmable logic to perform a transform of a unique identifier, which transform 430 is then written to a user register 302 of a protection register 201 at 403. Optionally, at 404, a lock bit, if available, may be set to prevent alteration of the transform 430 written to the user register at 403.

Once a transform 430 is written to a user register, it should be appreciated that the unique identifier and the user identifier, namely the transform of the unique identifier, may be used for authentication. Examples for authentication, which may be employed in any of the systems of FIGS. 2A through 2D, are described below in additional detail.

Figure 5A:
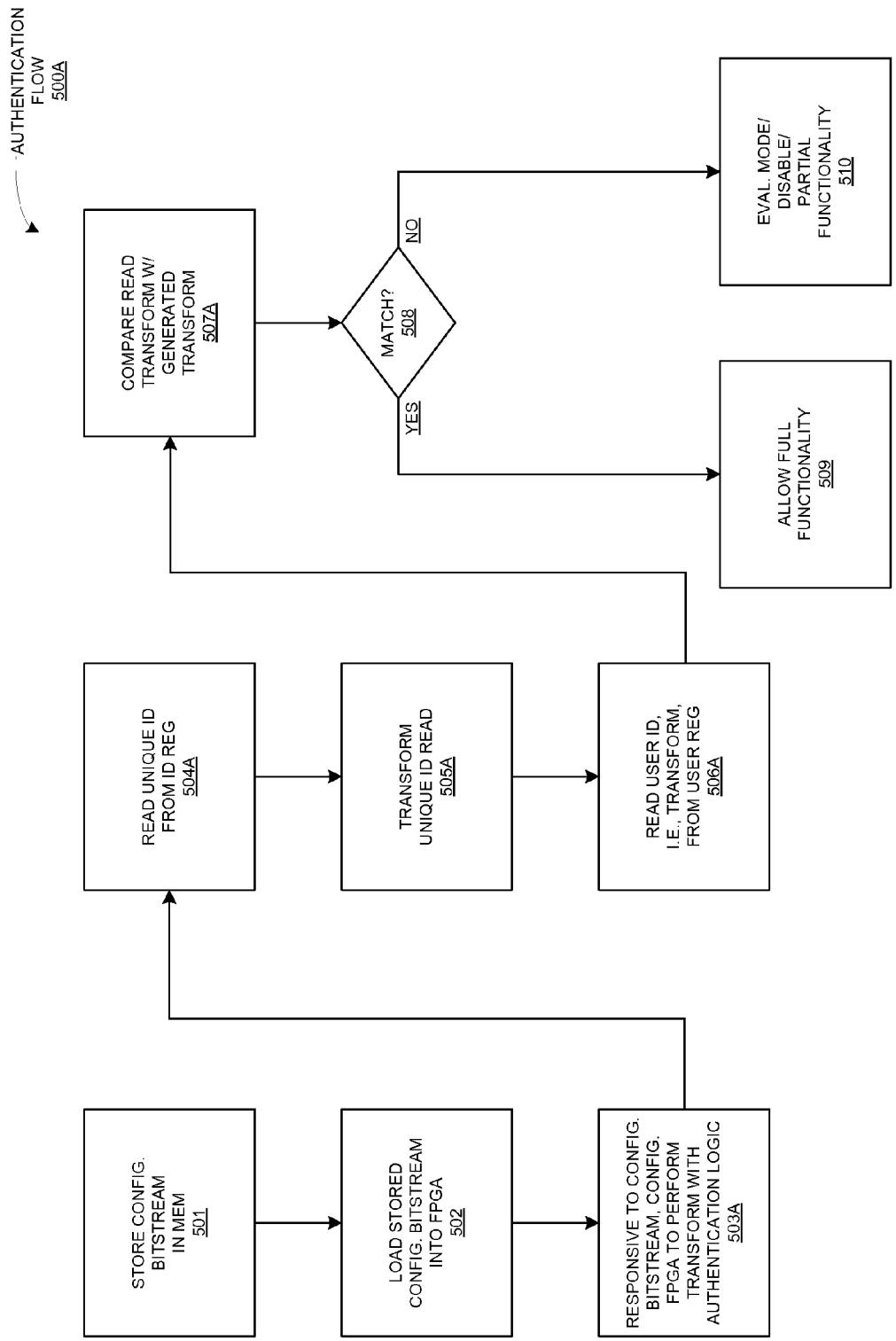
FIGS. 5A and 5B are high-level flow diagrams depicting exemplary alternative embodiments of respective authentication flows.

FIG. 5A is a high-level flow diagram depicting an exemplary embodiment of an authentication flow 500A. At 501, configuration information, such as a configuration bitstream, for programming programmable logic of a PLD to perform a transform is stored in memory. At 502, the stored configuration bitstream is loaded into an FPGA. Notably, for an FPGA which includes both embedded memory in which a configuration bitstream may be stored and programming to program programmable logic to perform a transform, operation 502 may avoided.

At 503A, responsive to the configuration bitstream stored at 501, an FPGA is configured with programmable logic to perform a transform. Notably, in some FPGAs, it is possible to do a partial configuration first before configuring the entire FPGA with a configuration bitstream. In other FPGAs, the entire configuration bitstream is used to configure the FPGA first. Either of these types of FPGAs may be used. Thus, at 503A, "authentication logic" is configured from programmable logic to perform a transform.

At 504A, a unique identifier is read from an identification register 301. At 505A, the authentication logic programmed in the FPGA at 503A is used to transform the unique identifier read at 504A. At 506A, a user identifier, namely a transform of the unique identifier supplied by the manufacturer as described above, is read from a user register 302. At 507A, the transform generated at 505A is compared with the user identifier read at 506A.

At 508, it is determined whether or not there is a match between the transform generated from the unique identifier and that read from the user identifier. If there is a match between these two identifiers, then at 509, full functionality of the FPGA may be allowed. If, however, these two identifiers do not match as determined at 508, then at 510, any of a variety of levels of functioning, or non-functioning, may be allowed. For example, at 510 an evaluation mode may be allowed which only allows full functionality for a limited period of time. Alternatively, at 510, no functionality may be allowed and the FPGA may be entirely disabled. Yet another alternative at 510 would be to allow partial functionality of the FPGA. Furthermore, FPGA functionality may be affected by activating or deactivating certain internal flip-flops, set or reset signals, or clock networks, including digital clock managers ("DCMs").

It should be appreciated that the transformation, as well as the comparison of the transform result obtained at 505A and the user identifier read at 506A may be done entirely in the FPGA. Thus, the authentication operation may be internal to the integrated circuit, which mitigates against unauthorized use.

Figure 5B:
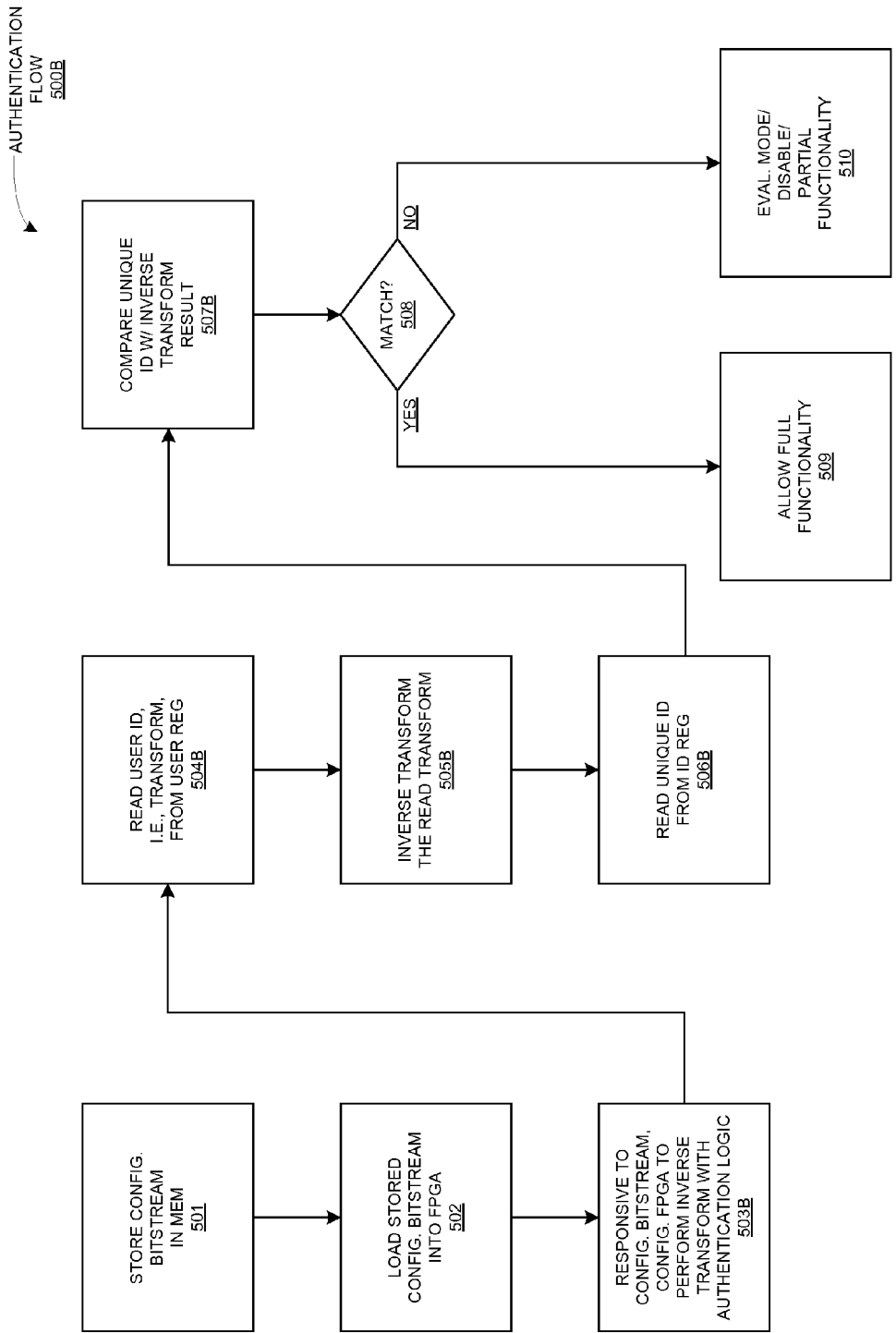

Notably, alternatively, other flows may be used provided that the user identifier is generated as a result of the unique identifier, and thus a correlation may be done for authentication. For example, FIG. 5B is a high-level flow diagram depicting an exemplary alternative embodiment of an authentication flow 500B. Authentication flow 500B is the same as authentication flow 500A except that blocks 503A through 507A are respectively replaced with blocks 503B through 507B. Accordingly, as much of the description is the same between authentication flows 500A and 500B, such same description is not repeated.

At 503B, an FPGA is configured responsive to a configuration bitstream. This configuration includes programming programmable logic of the FPGA to provide "authentication logic" to perform an inverse transform. At 504B, a user identifier, namely a transform of the unique identifier supplied by the manufacturer, is read from a user register. At 505B, an inverse transform using the inverse transform circuitry configured at 503B is performed on the user identifier read at 504B.

At 506B, a unique identifier is read from an identification register. At 507B, the unique identifier read at 506B is compared with the inverse transform result obtained at 505B. At 508, it is determined whether there is a match, for purposes of authentication, as described above.

Because the transformation operation is implemented in programmable logic of an FPGA, an end customer may determine and control the algorithm. This facilitates having the FPGA end customer determine how involved or how elaborate the transformation process implemented may be, and facilitates having the customer keep the transformation algorithm a secret. Additionally, the customer may determine how the remainder of the FPGA application behaves responsive to whether authentication is confirmed or not at 508. Again, a customer could decide responsive to a failed authentication to completely disable the FPGA application, force the PLD system into a destructive state, allow the PLD system to operate in an evaluation mode for a period of time, or perform another operation deemed appropriate by the customer. With respect to disabling the FPGA, the FPGA may further be used to erase the memory, including any externally attached memory, and reset itself. Alternatively, the FPGA may be configured to short pins together to disable the part. Notably, there may be a failsafe procedure prior to erasing the FPGA and memory or prior to disabling the FPGA. Furthermore, the FPGA may be caused to operate at a lower clock rate than would be optimal.

By giving a customer the ability to have a rights management system suitable for an end application, including the ability to provide updates, as described elsewhere herein, enhanced application flexibility is facilitated. Additionally, other logistical benefits may be facilitated such as when using a contract manufacturer to build FPGAs as described elsewhere herein. Notably, this authentication approach is not foolproof, but provides an obstacle against unauthorized use. Additionally, with respect to use of external memories, such external memories may have manufacturing identification codes that store information such as the manufacturing date, testing information, and location of the memory die on a silicon wafer, as well as the lot and batch in which such silicon wafer was processed. This manufacturing identification information may have sufficient uniqueness for the above-described authentication, and thus may be used to provide the unique identifier with respect to use of an external memory paired with an FPGA.

As mentioned above, a lock bit may be set to prevent a user identifier stored in user register 302 of FIG. 3 from being intentionally or accidentally altered by a customer or an application, which alteration may disable authentication. More particularly, such lock bit may be a one-time programmable element, and hence once it is programmed there is no means to deprogram the bit. However, if the lock bit is not present or is left unset, various rights management processes may be implemented as described below in additional detail.

Figure 6:
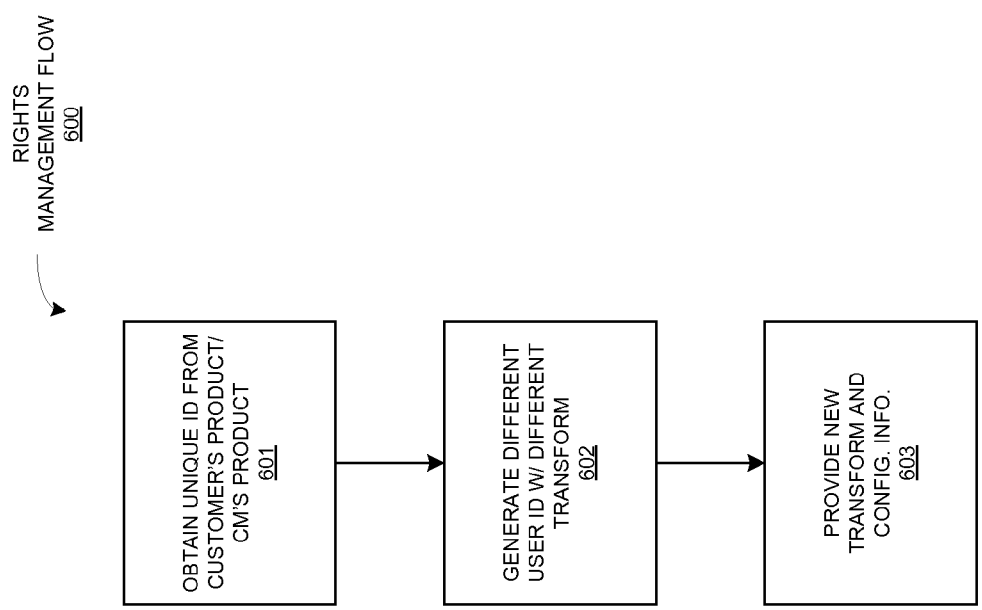
FIG. 6 is a high-level block diagram depicting an exemplary embodiment of a rights management flow.

FIG. 6 is a high-level block diagram depicting an exemplary embodiment of a rights management flow 600, which is described with additional reference to FIGS. 2A through 2D and FIG. 3. By leaving a lock bit unprogrammed, or not having a lock bit set, rights management may be used. Alternatively, a lock bit may be programmed but accessed by a manufacturer for rights management. Notably, however, if a manufacturer can access a lock bit, it is possible that a user may determine how to access that same bit.

An initial version of a system, such as any of the systems of FIGS. 2A through 2D, may be shipped with an initial user identifier stored in user register 302. At 601, a system manufacturer may obtain a unique identifier from a customer's product. For FPGAs with an Ethernet interface, this may be done by coupling the FPGA to a network, such as the Internet. For security reasons, a secure sockets layer ("SSL") session may be established for this communication.

Notably, rights management need not be just for end users, but may be done for a contract manufacturer ("CM"). With respect to a contract manufacturer of FPGAs, they may be provided with a transform of a unique identifier, which would allow functionality for testing at the contract manufacturer level to meet contract level performance.

At 602, after obtaining either a customer's or a contract manufacturer's unique identifier at 601, a different transform may be performed to generate a different user identifier than the initial user identifier shipped. In the application of an end user, this transform may be provided such as via the above-mentioned network to the end user for programming user register 302. In addition to the updated user identifier, the configuration bitstream associated with the different transformation may be provided to the end user for updating the configuration bitstream of such end user. Again, this information may be communicated via network as described above. Alternatively, there are many known means for providing information that may be used other than the above-described network approach.

With respect to the contract manufacturer application, a design entity contracting with the contract manufacturer may use a different transform to provide a different user identifier at 602 than the user identifier provided to the contract manufacturer. As this different transform would not be known to the contract manufacturer, if the contract manufacturer's user identifier was leaked, the functionality of the FPGA would be limited according to that contract manufacturer's user identifier level of privilege. However, because such functionality of the FPGA may be limited, full functionality may not be leaked. Rather, full functionality may only be obtained responsive to use of the updated user identifier using the transform of 602.

In the application of a contract manufacturer, the design entity may market the FPGA system, as previously described with reference to FIGS. 2A through 2D, with the unique identifier obtained at 601 and with the updated user identifier generated at 602. Additionally, the configuration bitstream for generating the transform, which was not present with the contract manufacturer, may be provided to the end user at 603, as previously described.

With reference to a customer's product application, the FPGA system may be updated in response to use of the transform generated at 602 and provided at 603 along with transform configuration information. This update may be in response to an upgrade purchase, a service contract update, or other known form of rights management.

Thus, it should be appreciated that with a variety of transforms, different levels of usage may be provided to end users. Furthermore, it should be appreciated that contract manufacturers, or other contractors involved in providing an end product, may be provided with user identifiers limiting functionality of the FPGA sufficient to perform under the contract, but not sufficient to provide a product for an end user. Notably, the overhead for such rights management, may be reduced by having external memory delivered with factory-programmed, manufacturer-provided unique identifiers. Furthermore, it should be appreciated that the transform configuration bitstream need not be encrypted, as this type of protection may entirely depend on authentication. Thus, a configuration bitstream may appear as "clear text" within an application.

Thus, the only additional overhead may be programming a user register with a user identifier, as well as providing a configuration bitstream for a transform. Furthermore, it should be appreciated that a user identifier as well as a unique identifier may be programmed with a device programmer at the same time, such as when programming a memory with a configuration bitstream.

Alternatively, memory may be assembled in a system, and such memory may be authenticated as a step during final system test. This authentication may be done using the JTAG interface of an FPGA. For example, a user register programmed using an FPGA's JTAG may involve: having a JTAG host use the JTAG boundary-scan chain of the FPGA to read a unique identifier from memory coupled to the FPGA; the JTAG host may then calculate a user identifier to be written to the memory coupled to the FPGA; and the JTAG host may then use the FPGA's JTAG boundary-scan chain to write the user identifier into the memory coupled to the FPGA. Thus, the FPGA configuration bitstream stored in memory may be authenticated to allow the system to function at a predetermined level. Examples of a JTAG host may include a JTAG tester, a personal computer or workstation configured to communicate using a JTAG protocol.

Figure 7:
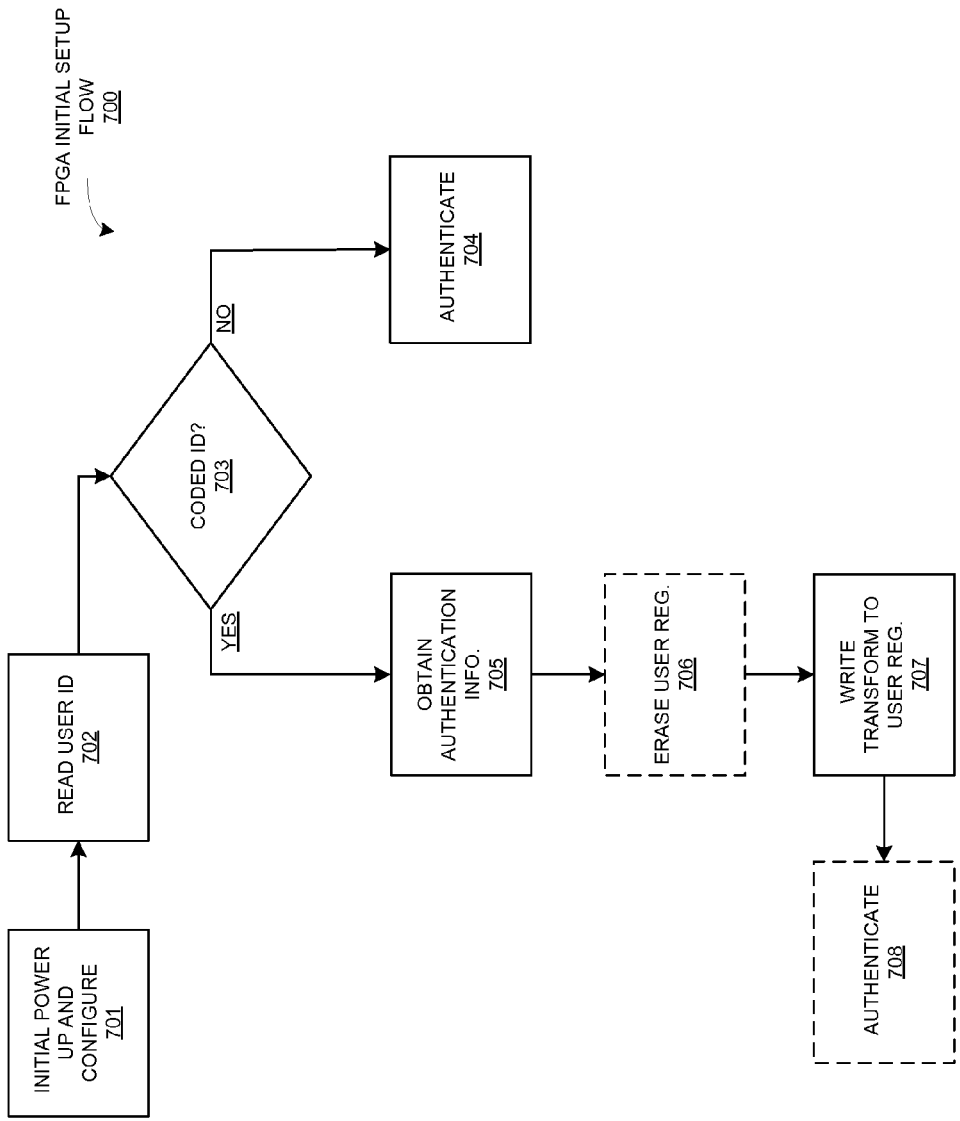
FIG. 7 is a high-level flow diagram depicting an exemplary embodiment of an FPGA initial set-up flow.

FIG. 7 is a high-level flow diagram depicting an exemplary embodiment of an FPGA initial set-up flow 700. At 701, an FPGA is initially powered up. Also at 701, after the initial power-up, the FPGA may be partially configured or fully configured using a configuration bitstream. For either partial configuration or full configuration, a transform or inverse transform is configured in programmable logic of the FPGA. Notably, at 701 the initial power-up may be a power-on reset.

At 702, a user identifier is read. At 703, it is determined whether the user identifier is coded. For example, if the user register is unprogrammed, then its values may all be logic 1's. This would be an example of a coded identifier for a user identifier. The FPGA, reading the user identifier and acknowledging that it is coded at 703, may perform a transform of the unique identifier. In order to perform a transform, at 705 authentication information is obtained. The authentication information obtained may include reading a unique identifier and generating a transformation of the unique identifier to provide a non-coded user identifier. At 706, the user register may be erased, and at 707, the non-coded user identifier may be written to the user register. Notably, it may be possible to merely overwrite the user register and thus the operation of erasing the user register at 706 may be optional. Optionally, at 708, the user identifier generated at 705 may be authenticated to confirm a successful transformation.

Alternatively, at 703, if it is determined that the user identifier is not coded, then an authentication procedure as previously described herein may take place at 704.

Thus, it should be appreciated that by using a coded identifier, for example, an FPGA fabless entity may contract with a foundry. The foundry would have the coded identifier, but not have any knowledge of the transform used to provide a user identifier for an end product. Thus, the coded identifier may be associated with limited functionality of the FPGA sufficient for the purposes of completing the contract with a foundry, such as testing for example, but not sufficient for delivering a product to an end user. In other words, if the coded identifier was illegally leaked from the contract manufacturer, such coded identifier could only be used to provide a subset of FPGA functionality. This is thus another form of rights management for use with contract manufacturers.

Notably, the above description has been in terms of PLDs coupled to memory. Furthermore, it should be understood that authentication may be done with or without encryption of configuration bitstreams or other programming files. Additionally, it should be appreciated that other memory-based devices that read configuration data or application data from an external device, such as microprocessors, digital signal processors, or microcontrollers, may employ authentication provided they have sufficient programmable logic to program a transform or inverse transform. Furthermore, additional PLD functionality may be used when communicating with an external memory. For example, the Spartan®-3 FPGA generation available from Xilinx, Inc. of San Jose, Calif., in addition to being able to be configured from externally coupled memory, can write and read values to external memory.

Figure 8:
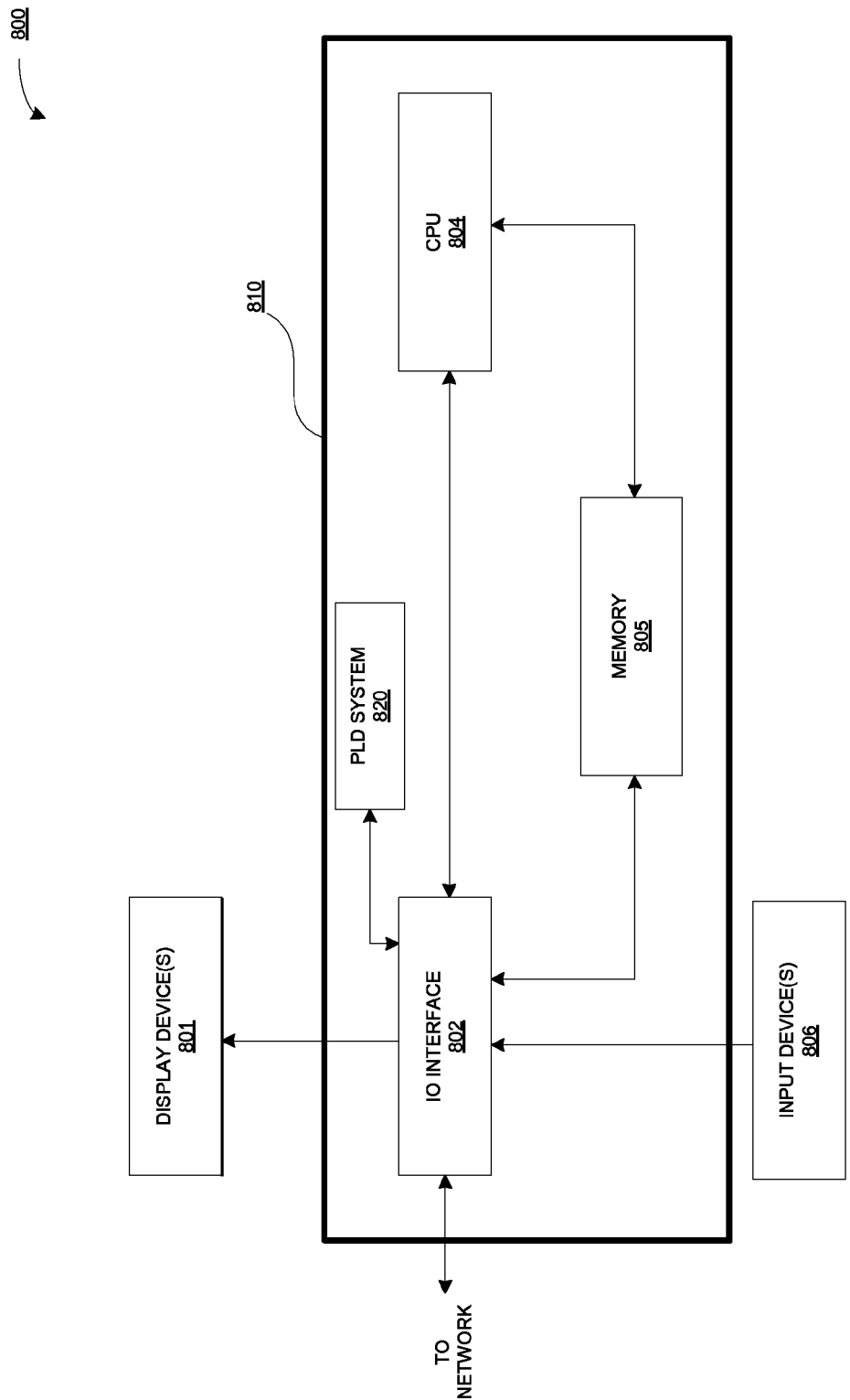
FIG. 8 is a high-level block diagram of an exemplary embodiment of a computer system.

FIG. 8 is a high-level block diagram of an exemplary embodiment of a computer system 800. Computer system 800 may include a programmed computer 810 coupled to one or more display devices 801, such as Cathode Ray Tube ("CRT") displays, Plasma displays, Liquid Crystal Displays ("LCD"), and to one or more input devices 806, such as a keyboard and a cursor pointing device. Other known configurations of computer system 800 may be used.

Programmed computer 810 may be programmed with a known operating system ("OS"), which may be OS/2, MAC OS, Java Virtual Machine, Linux, Solaris, UNIX, or a Windows operating system, among other known platforms. At least a portion of an operating system may be disposed in memory 805. Memory 805 may include one or more of the following: random access memory, read only memory, magneto-resistive read/write memory, optical read/write memory, cache memory, magnetic read/write memory, and the like.

Programmed computer 810 includes a central processing unit (CPU) 804, memory 805, an input/output ("IO") interface 802, and a PLD system 820. CPU 804 may be a type of microprocessor known in the art, such as available from Intel, IBM, Apple Computer, and Advanced Micro Devices for example. Support circuits (not shown) may include conventional cache, power supplies, clock circuits, data registers, and the like.

IO interface 802 may include chip set chips, graphics processors, and daughter cards, among other known circuits. An example of a daughter card may include a network interface card ("NIC"), a display interface card, a modem card, and a Universal Serial Bus ("USB") interface card, among other known circuits. Thus, IO interface 802 may be coupled to a conventional keyboard, network, mouse, display printer, and interface circuitry adapted to receive and transmit data, such as data files and the like. Notably, programmed computer 810 may be coupled to a number of client computers, server computers, or any combination thereof via a conventional network infrastructure, such as a company's Intranet and/or the Internet, for example, allowing distributed use for interface generation.

A PLD system 820, such as described with reference to any of FIGS. 2A through 2D, may be coupled to IO interface 802 for establishing a network session. Accordingly, a user identifier may be updated using such network session as previously described herein.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for rights management of an integrated circuit, comprising:
    obtaining a first identifier stored in first storage devices, the first identifier being associated with a system implementing the integrated circuit;
    selecting a transformation operation for transforming the first identifier;
    providing, in a configuration bitstream, configuration information for configuring programmable resources of the integrated circuit to enable the selected transformation operation;
    configuring the programmable resources with the configuration information to implement the selected transformation operation;
    transforming the first identifier using the selected transformation operation to provide a second identifier; and
    authenticating a use of the configuration bitstream in the integrated circuit by comparing the second identifier with a stored second identifier.

2. The method according to claim 1, wherein the first storage devices are located in the integrated circuit.

3. The method according to claim 1, wherein the first storage devices are located externally to the integrated circuit.

4. The method according to claim 1, wherein the stored second identifier is stored in second storage devices located in the integrated circuit.

5. The method according to claim 1, wherein the stored second identifier is stored in second storage devices located externally to the integrated circuit.

6. A method for rights management of an integrated circuit, comprising:
    selecting a transformation operation for transforming an identification;
    providing, in a configuration bitstream, configuration information for configuring programmable resources of the integrated circuit to enable the selected transformation operation;
    configuring the programmable resources with the configuration information to implement the selected transformation operation;
    transforming the identification using the selected transformation operation; and
    authenticating a use of the configuration bitstream in the integrated circuit based upon a result of the transforming the identification.

7. The method of claim 6, further comprising storing a unique identification in a memory associated with the integrated circuit, wherein transforming the identification comprises transforming the unique identification.

8. The method of claim 7, wherein authenticating a use of the configuration bitstream comprises comparing the transformed unique identification with a user identification.

9. The method of claim 8, further comprises storing the user identification in a register and preventing altering the user identification in the register.

10. The method of claim 6, further comprising storing a user identification in a memory associated with the integrated circuit, wherein transforming an identification comprises transforming the user identification.

11. The method of claim 10, wherein authenticating a use of the configuration bitstream comprises comparing the transformed user identification with a unique identification associated with a system implementing the integrated circuit.

12. The method of claim 6, wherein the configuration bitstream is encrypted, the method further comprising decrypting the encrypted configuration bitstream.

13. A method for rights management of an integrated circuit, comprising:
    selecting a transformation operation for transforming an identification;
    storing a unique identification for a system implementing the integrated circuit;
    storing a user identification comprising a transform of the unique identification by the transformation operation;
    providing, in a configuration bitstream, configuration information for configuring programmable resources of the integrated circuit to enable the selected transformation operation or an inverse of the selected transformation operation;
    configuring the programmable resources to implement the selected transformation operation or the inverse of the selected transformation operation;
    transforming one of the stored unique identification and the stored user identification; and
    authenticating a use of the configuration bitstream in the integrated circuit by comparing the result of the transforming with the other of the stored unique identification and the stored user identification.

14. The method of claim 13, wherein storing a unique identification comprises writing a unique identification to a memory associated with the integrated circuit during manufacturing of the memory.

15. The method of claim 13, wherein storing a user identification comprises storing the user identification in a memory associated with the integrated circuit by a user of the integrated circuit.

16. The method of claim 15, further comprising preventing changing the user identification after storing the user identification.

17. The method of claim 13, wherein providing, in a configuration bitstream, configuration information comprises providing an encrypted configuration bitstream.

18. The method of claim 17, further comprising decrypting the encrypted configuration bitstream.

19. The method of claim 13, further comprising providing full functionality if the configuration bitstream is authenticated.

20. The method of claim 13, further comprising providing partial functionality if the configuration bitstream is not authenticated.

* * * * *